Feb. 23, 1932.  W. C. STARKEY  1,846,696
SPRING CLUTCH
Filed April 22, 1929
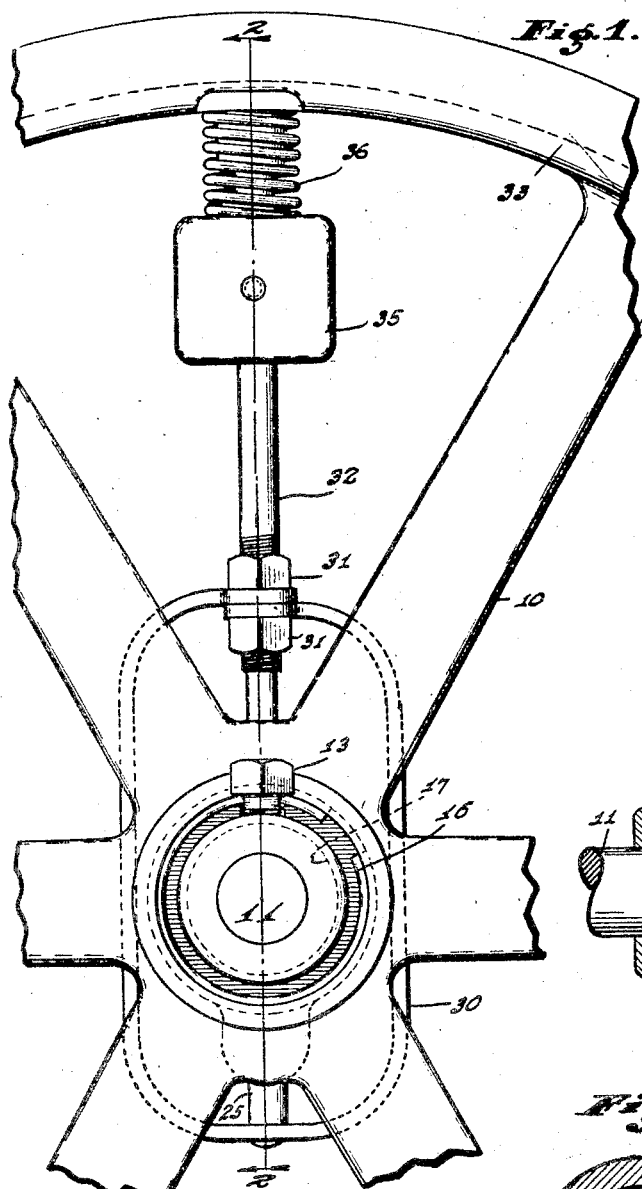
Fig.1.
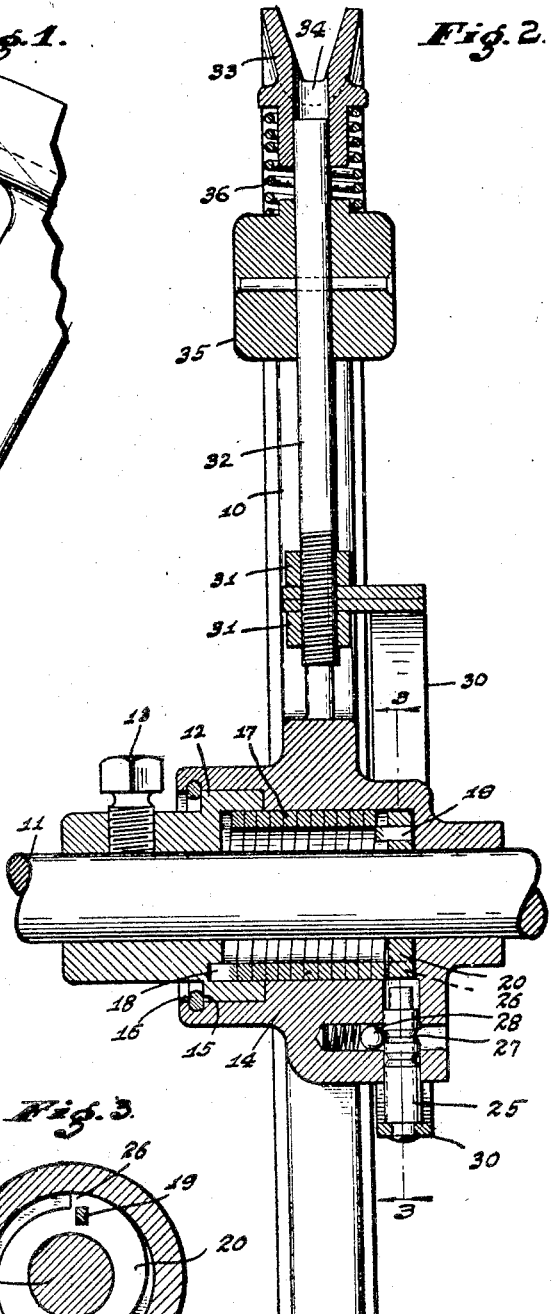
Fig.2.
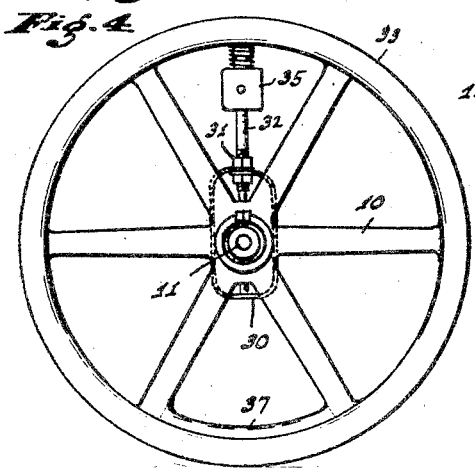
Fig.4.
Fig.3.
Inventor
WILLIAM CARLETON STARKEY,
By Ashley Trask
Attorneys Patented Feb. 23, 1932

1,846,696

UNITED STATES PATENT OFFICE

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA

SPRING CLUTCH

Application filed April 22, 1929. Serial No. 356,990.

It is the object of my invention to produce a clutch which will operate automatically to clutch together a driving member and a driven member when the driving member has attained a predetermined speed. More specifically it is my object to produce such a clutch in which the parts which move to effect clutching may be made relatively light in weight in order that the clutch-actuating mechanism may be simple in construction and positive in operation.

I accomplish the above objects by constructing the driving and driven members with alined co-axial recesses in which I locate a helical spring operatively connected to one of the members and connectible to the other member through the medium of actuating mechanism responsive to centrifugal force.

The accompanying drawings illustrate my invention: Fig. 1 is a fragmental end elevation of my clutch mechanism; Fig. 2 is a section on the line 2—2 of Fig. 1; Fig. 3 is a transverse section on the line 3—3 of Fig. 2; and Fig. 4 is a complete end elevation of my clutch, similar to Fig. 1 but on a smaller scale.

In the embodiment of my invention shown in the drawings, my clutch is illustrated as operating between a driving pulley 10 and a driven shaft 11. This showing is merely illustrative however, as the driving and driven members may be different from those illustrated.

The shaft 11 has rotatable with it a clutch member in the form of a cup 12 which may be secured to the shaft by a set screw 13. The cup 12 is received within the counterbored portion of the hub 14 of the pulley 10, such counterbored portion preferably being deep enough to extend axially beyond a shoulder 15 on the cup 12 and to be there provided with an annular groove for the reception of a split spring ring 16 which engages the shoulder 15 and retains the cup 12 and pulley-hub 14 in fixed axial relation.

Located within the cup 12 and extending into the bore of the hub 14 is a helical spring 17. This spring 17 is connected to the cup 12 in order that it may rotate therewith. One method of effecting this result is to provide the cup 12 in the bottom of its recess with a hole adapted to receive the out-bent end 18 of the spring 17.

The other end of the spring 17 is also bent outward as at 19 and is adapted to be received in an opening in a disk or washer 20 which is free to rotate relative to the shaft 11 and pulley 10 except so far as it is constrained by reason of its connection with the spring.

The spring 17 has a normal exterior diameter somewhat less than that of the bore of the pulley-hub 14. Therefore, unless the washer 20 is connected to the pulley 10, such pulley may rotate freely relative to the shaft 11.

The clutch-actuating mechanism which I employ cooperates with the washer 20 and serves to connect it with the pulley 10. When the pulley 10 is rotated with the washer 20 connected to it, the spring 17 is subjected to a torque which causes it to expand into firm engagement with the walls of its associated recesses to clutch the pulley hub 14 to the cup 12.

The clutch-actuating mechanism may take several forms. In the form shown in the drawings, there is a clutch-actuating pin 25 which is radially slidable into and out of engagement with one or more abutments 26 provided on the periphery of the washer 20. To insure that the pin 25 will be either fully in or fully out of engagement with the abutment 26, I may provide it with a pair of spaced annular grooves 27 which co-operate with a spring-pressed ball 28 mounted in the pulley-hub 14. The pin 25 is carried by a yoke 30 in the form of a looped strip of metal which straddles the hub 14 and has its ends connected as by means of nuts 31 to a radially slidable rod 32. To provide a support for the outer end of the rod 32, the rim 33 of the pulley 10 is provided with a hole 34 in which the outer end of the rod 32 is received. Secured to the rod 32 is a weight 35 spring-pressed radially inward by means of a compression spring 36 which operates between the weight and the rim 33. To counter-balance the weight 35, the rim 33 opposite such weight may be thickened slightly as at 37.

The clutch mechanism described is particularly adapted to a situation in which it is desired to connect the rotating driving member to a driven member only after the driving member has reached a predetermined rotational speed. Until this speed is attained, the spring 36 holds the weight inward with the pin 25 out of engagement with the abutments 26 on the washer 20.

As has been previously pointed out, the spring 17 has a diameter less than that of the bore of the pulley-hub 14, and the driving member is therefore free to rotate relatively to the driven shaft 11. As the rotational speed of the driving pulley 10 increases, the centrifugal force of the weight 35 eventually overcomes the resistance offered by the spring 36 and the weight moves outward to bring the pin 25 into engagement with one of the abutments 26 on the washer 20. The action of the spring-pressed ball 28 insures that the movement of the pin 25 will continue when once started. As a result of the engagement of the pin 25 with one of the abutments 26, the washer 20 is forced to rotate with the pulley 10, thus imposing a torque on the spring 17 and causing such spring to expand into firm frictional engagement with the inner surface of the pulley hub 14 to clutch the pulley to the shaft 11. If the velocity of the pulley 10 drops below that sufficient to hold the weight 35 outward against the pressure exerted on it by the spring 36, the weight 35 will move inward and will carry the pin 25 out of engagement with the washer 20. When this occurs, the elasticity of the spring 17 causes it to be reduced in diameter and to recede from the walls of the recess in the pulley-hub 14, thus serving to declutch the pulley 10 from the shaft 11.

This clutch is particularly adapted for use in connection with electric motors having a relatively low starting torque, for it enables such motors to be used in driving compressors, pumps, or other devices which require a relatively high starting torque. When so used, my clutch permits the motor to attain a speed at which it is capable of exerting a considerable driving torque; and when that speed is reached, the clutch-actuating mechanism operates to connect the motor and the driven device. It is to be noted that the momentum possessed by the pulley 10 when it reaches the speed at which the clutch-actuating mechanism operates aids the motor in starting the driven device.

My clutch has an advantage over the prior centrifugal clutches of which I am aware in that it operates positively and still permits the use of relatively simple and light weight clutch-actuating mechanism which need not be strong enough to transmit more than a very small portion of the total torque transmitted from the driven member. The only torque transmitted by my clutch-actuating mechanism is that necessary to effect expansion of the clutch spring into engagement with the wall of the recess in the hub 14; and this torque may be very small, since the spring 17 may have a diameter only a few thousandths of an inch less than the recess of the hub 14. After the clutch spring 17 once engages the wall in the recess of the hub 14, further torque transmitted from the pulley 10 to the spring is taken at the surface of the spring and is not imposed on the spring-end 19, disk 20, or the pin 25. Thus, sensitive operation of the clutch-actuating mechanism is not prevented by reason of frictional drag resulting from relatively large forces transmitted between engaging parts.

A clutch somewhat similar to that shown in this application is described in my United States Letters Patent No. 1,762,799, issued June 10, 1930. In that patent, however, the clutch spring was operatively connected to the driving member and was connectible with the driven member through actuating mechanism responsive to centrifugal force; whereas in this application, the spring is always connected to the driven member and is connectible to the driving member by operation of the actuating mechanism. The construction illustrated in this application has the advantage of permitting a greater latitude in the type of actuating mechanism used.

I claim as my invention:—

1. In combination, a rotatable driving member, a rotatable driven member, said driving member being provided with an axial cylindrical recess, a helical spring located in said recess and operatively connected at one end to said driven member, a washer secured to the other end of said spring, said washer being provided on its periphery with one or more abutments, said spring having a normal diameter less than that of said recess in order that said driving and driven members may rotate relatively, a clutch-actuating member carried by said driving member and movable into and out of engagement with said abutments, and means carried by said driving member and responsive to centrifugal force for moving said clutch-actuating member.

2. The combination set forth in claim 1 with the addition of means tending to hold said clutch-actuating member either in or out of engagement with one of said abutments.

3. In combination, a rotatable driving member, a rotatable driven member, said driving member being provided with an axial cylindrical recess, a helical spring located in said recess and operatively connected at one end to said driven member, a washer secured to the other end of said spring, said washer being provided on its periphery with one or more abutments, said spring having a normal diameter less than that of said recess in order that said driving and driven members may rotate relatively, a clutch-actuating member carried by said driving member and movable into and out of engagement with said abutments, and means responsive to centrifugal force for moving said clutch-actuating member.

4. The combination set forth in claim 3 with the addition that said driven member has an axial cylindrical recess into which said spring extends.

5. In combination, two relatively rotatable coaxial clutch members, one of said members being provided with a circular axial recess, a helical spring operatively connected to the other of said members and extending into said recess, said spring normally being of smaller diameter than said recess, and clutch-actuating means for connecting said recessed member to the adjacent end of said spring whereby when the two clutch members tend to rotate in a direction to unwind said spring it will expand into gripping engagement with the wall of said recess, said actuating means including an element occupying one end of said recess and secured to the end of said spring and having one or more abutments, and a part rotatable with said recessed clutch member and movable into or out of engagement with said abutments.

6. In combination with two relatively rotatable coaxial clutch members one of which has an axial recess, a helical spring operatively connected at one end to the other clutch member and being of a normal diameter less than that of said recess and extending thereinto and means for connecting the other end of said spring to said first mentioned clutch member and comprising a member occupying the associated end of said recess and receiving a toe on the associated end of said spring and having abutments in its periphery and a part carried by said first mentioned clutch member and movable into and out of a position to engage said abutments.

In witness whereof, I have hereunto set my hand at Indianapolis, Ind., this 19th day of April, A. D. one thousand nine hundred and twenty-nine.

WILLIAM CARLETON STARKEY.